US011593836B2

(12) United States Patent
Aggarwal et al.

(10) Patent No.: US 11,593,836 B2
(45) Date of Patent: *Feb. 28, 2023

(54) INBOX MANAGEMENT SYSTEM

(71) Applicant: Groupon, Inc., Chicago, IL (US)

(72) Inventors: Amit Aggarwal, Sunnyvale, CA (US); David Thacker, Burlingame, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,239

(22) Filed: Jan. 13, 2021

(65) Prior Publication Data

US 2021/0209639 A1  Jul. 8, 2021

Related U.S. Application Data

(63) Continuation of application No. 16/225,143, filed on Dec. 19, 2018, now Pat. No. 11,250,467, which is a
(Continued)

(51) Int. Cl.
*G06Q 30/0251* (2023.01)
*G06Q 30/0242* (2023.01)
*G06Q 30/02* (2023.01)

(52) U.S. Cl.
CPC ......... *G06Q 30/0251* (2013.01); *G06Q 30/02* (2013.01); *G06Q 30/0242* (2013.01);
(Continued)

(58) Field of Classification Search
CPC ............................................ G06Q 30/02–0277
See application file for complete search history.

(56) References Cited

U.S. PATENT DOCUMENTS

| 4,212,231 A | 7/1980 | Penick et al. |
| 6,029,195 A | 2/2000 | Herz |

(Continued)

FOREIGN PATENT DOCUMENTS

| WO | 02/41209 A1 | 5/2002 |
| WO | 2014/004810 A2 | 1/2014 |

OTHER PUBLICATIONS

A Location-based Mobile Advertisement Publishing System for vendors (Year: 2011).
(Continued)

*Primary Examiner* — Raquel Alvarez
(74) *Attorney, Agent, or Firm* — Alston & Bird LLP

(57) ABSTRACT

Electronic correspondence that includes one or more promotions may be generated for presenting to a consumer. In order to determine whether to present the electronic correspondence to the consumer, the promotions included in the electronic correspondences may be analyzed in terms of a probability the consumer will accept the promotions, a relevance level between the promotions and attributes of the consumer, a relevance level between the promotions and the consumer, a relevance level between the promotions and a set of goals or rules, among other similar terms. After the analysis, a determination may be made whether to send the electronic correspondence to the consumer. Similarly, the analysis may compare multiple electronic correspondences, and determine, based on the comparison, which of the multiple electronic correspondences to send to the consumer.

20 Claims, 8 Drawing Sheets

Related U.S. Application Data continuation of application No. 13/838,452, filed on Mar. 15, 2013, now Pat. No. 10,198,742.

(60) Provisional application No. 61/666,556, filed on Jun. 29, 2012.

(52) U.S. Cl.
CPC ..... *G06Q 30/0254* (2013.01); *G06Q 30/0255* (2013.01); *G06Q 30/0264* (2013.01); *G06Q 30/0271* (2013.01)

(56) References Cited

U.S. PATENT DOCUMENTS

| | | | |
|---|---|---|---|
| 6,336,099 | B1 | 1/2002 | Barnett et al. |
| 6,415,262 | B1 | 7/2002 | Walker et al. |
| 6,922,672 | B1 | 7/2005 | Hailpern et al. |
| 7,251,617 | B1 | 7/2007 | Walker et al. |
| 7,809,601 | B2 | 10/2010 | Shaya et al. |
| 7,899,866 | B1 | 3/2011 | Buckingham et al. |
| 8,271,328 | B1 | 9/2012 | Baltz et al. |
| 8,359,238 | B1 | 1/2013 | Kauchak et al. |
| 8,583,484 | B1 | 11/2013 | Chalawsky et al. |
| 8,762,201 | B1 | 6/2014 | Noonan |
| 9,231,897 | B1 | 1/2016 | Liden |
| 10,535,076 | B1 | 1/2020 | Thacker et al. |
| 11,080,754 | B1 | 8/2021 | Han et al. |
| 2001/0032247 | A1 | 10/2001 | Kanaya |
| 2002/0007356 | A1 | 1/2002 | Rice et al. |
| 2002/0032602 | A1 | 3/2002 | Lanzillo et al. |
| 2002/0161664 | A1 | 10/2002 | Shaya et al. |
| 2002/0161779 | A1 | 10/2002 | Brierley et al. |
| 2003/0018780 | A1 | 1/2003 | Kawashima |
| 2003/0105664 | A1 | 6/2003 | Van Luchene |
| 2003/0208399 | A1 | 11/2003 | Basak et al. |
| 2004/0088363 | A1 | 5/2004 | Doemling et al. |
| 2005/0228719 | A1 | 10/2005 | Roberts et al. |
| 2006/0135233 | A1 | 6/2006 | Willis et al. |
| 2006/0136545 | A1 | 6/2006 | Reistad et al. |
| 2007/0055565 | A1 | 3/2007 | Baur et al. |
| 2007/0055569 | A1 | 3/2007 | Subramanian et al. |
| 2007/0061195 | A1 | 3/2007 | Liu et al. |
| 2007/0083433 | A1 | 4/2007 | Lawe |
| 2007/0112920 | A1 | 5/2007 | Hay |
| 2007/0150342 | A1 | 6/2007 | Law et al. |
| 2008/0015936 | A1 | 1/2008 | Bibelnieks et al. |
| 2008/0015938 | A1 | 1/2008 | Haddad et al. |
| 2008/0027787 | A1 | 1/2008 | Malsbenden et al. |
| 2008/0103909 | A1 | 5/2008 | Huang et al. |
| 2008/0160956 | A1 | 7/2008 | Jackson et al. |
| 2008/0202889 | A1 | 8/2008 | Breitenbach et al. |
| 2008/0208787 | A1 | 8/2008 | Luchene |
| 2008/0262928 | A1 | 10/2008 | Michaelis |
| 2009/0030798 | A1 | 1/2009 | Otto et al. |
| 2009/0047946 | A1 | 2/2009 | Sato et al. |
| 2009/0144201 | A1 | 6/2009 | Gierkink et al. |
| 2009/0164296 | A1 | 6/2009 | Phan |
| 2009/0216579 | A1 | 8/2009 | Zen et al. |
| 2009/0265763 | A1 | 10/2009 | Davies et al. |
| 2010/0088157 | A1 | 4/2010 | Wilson |
| 2010/0250359 | A1 | 9/2010 | Gillenson et al. |
| 2010/0299209 | A1 | 11/2010 | Mehta et al. |
| 2010/0318407 | A1 | 12/2010 | Leff et al. |
| 2010/0318418 | A1 | 12/2010 | Wertheimer et al. |
| 2011/0016161 | A1 | 1/2011 | Loeb |
| 2011/0055001 | A1 | 3/2011 | Mattern et al. |
| 2011/0066692 | A1 | 3/2011 | Ciancio-Bunch et al. |
| 2011/0184937 | A1 | 7/2011 | Jin |
| 2011/0191176 | A1 | 8/2011 | Merriman et al. |
| 2011/0208578 | A1 | 8/2011 | Bergh et al. |
| 2011/0208585 | A1 | 8/2011 | Daboll et al. |
| 2011/0225034 | A1 | 9/2011 | Bayat |
| 2011/0246297 | A1 | 10/2011 | Buchalter et al. |
| 2011/0288921 | A1 | 11/2011 | King |
| 2012/0022944 | A1 | 1/2012 | Volpi |
| 2012/0042025 | A1 | 2/2012 | Jamison et al. |
| 2012/0054020 | A1 | 3/2012 | Jacobs |
| 2012/0054031 | A9 | 3/2012 | Walker et al. |
| 2012/0116840 | A1 | 5/2012 | Omer |
| 2012/0130817 | A1 | 5/2012 | Bousaleh et al. |
| 2012/0143666 | A1 | 6/2012 | Carrion et al. |
| 2012/0191530 | A1 | 7/2012 | Williams et al. |
| 2012/0265597 | A1 | 10/2012 | Saha et al. |
| 2012/0265646 | A1 | 10/2012 | Ghadialy et al. |
| 2012/0278172 | A1 | 11/2012 | Mercuri et al. |
| 2012/0290383 | A1 | 11/2012 | Busch |
| 2012/0330741 | A1 | 12/2012 | Cruz |
| 2013/0013545 | A1 | 1/2013 | Agarwal et al. |
| 2013/0024298 | A1 | 1/2013 | Irvine et al. |
| 2013/0073381 | A1 | 3/2013 | Binkley |
| 2013/0085804 | A1 | 4/2013 | Leff et al. |
| 2013/0124299 | A1 | 5/2013 | Montgomery et al. |
| 2013/0132365 | A1 | 5/2013 | Chang et al. |
| 2013/0159192 | A1 | 6/2013 | Partridge et al. |
| 2013/0173393 | A1 | 7/2013 | Calman et al. |
| 2013/0179264 | A1 | 7/2013 | Wilson |
| 2013/0290141 | A1 | 10/2013 | Bhaskar |
| 2013/0290503 | A1 | 10/2013 | Rajkumar et al. |
| 2014/0006129 | A1 | 1/2014 | Heath |
| 2014/0006139 | A1 | 1/2014 | Aggarwal et al. |
| 2014/0095324 | A1 | 4/2014 | Cabral et al. |
| 2014/0120864 | A1 | 5/2014 | Manolarakis et al. |
| 2014/0122238 | A1 | 5/2014 | Lewis et al. |

OTHER PUBLICATIONS

Advertisement System, Method and Computer Program Product (Year: 2006).
Design of Tag Match Advertising System and the evaluation of the business model (Year: 2008).
Anshin, Peter et al., "Developing an Index for Measuring the Engagement of Internet Media"; 2008 IEEE International Conference on Systems, Man and Cybernetics (SMC 2008); dated (2008); pp. 2182-2190.
Authors et al., "WI-OC-P Just-In-Time Promotion with Dynamic Adjustments Responsive to Customer Behavior", IP.com, dated (Mar. 6, 2009).
Byers et al., "Daily Deals Prediction, Social Diffusion, and Reputational Ramifications" dated (Sep. 7, 2011).
Drossos et al., "An Empirical Assessment of Factors that Influence the Effectiveness of SMS Advertising", Proceedings of the 40th Hawaii International Conference on System Sciences, dated (2007).
Extended European Search Report from corresponding European Patent Application No. 13739541.4 dated Dec. 11, 2015.
International Search Report and Written Opinion for Application No. PCT/US2013/048154 dated Dec. 1, 2014.
PCT International Preliminary Reporton Patentability for application PCT/US2013/048154 dated Dec. 31, 2014.
Rapleaf "The Consumer Data Marketplace" www.rapleaf.com/under-the-hood/ retrieved on May 7, 2013. (Year: 2013).
Supplementary European Search Report from corresponding European Patent Application No. 13739541.4 dated Jan. 8, 2016.
U.S. Application entitled "Sales Enhancement System", U.S. Appl. No. 13/460,745.
U.S. Patent Application filed Jan. 31, 2013, In re: Thacker entitled "entitled Pre-Feature Promotion System", U.S. Appl. No. 13/756,145.
U.S. Patent Application filed Mar. 15, 2013, In re: Aggarwal entitled "Cadence Management System for Consumer Promotions", U.S. Appl. No. 13/838,711.
U.S. Patent Application filed Mar. 15, 2013, In re: Li entitled "Promotion Offering System Analyzing Collection of Promotions", U.S. Appl. No. 13/838,415.
U.S. Patent Application filed Mar. 15, 2013, In re: Trimble entitled "Customization of Message Delivery Time Based on Consumer Behavior", U.S. Appl. No. 13/839,102.
U.S. Patent Application filed Mar. 2, 2012, In re: O'Brien entitled "Relevance System for Consumer Deals", U.S. Appl. No. 13/411,502.

(56) References Cited

OTHER PUBLICATIONS

U.S. Provisional Application entitled "Promotion Offering System Analyzing Collections of Promotions", U.S. Appl. No. 61/663,508.
A Multimethod Approach to Evaluating Social Media Campaign Effectiveness (Year: 2013).
Periodic Email Prompts to Re-Use an Internet-Delivered Computer-Tailored Lifestyle Program: Influence of Prompt Content and Timing (Year: 2013).
Targeted Advertising for the Communication Service Provider (Year: 2010).

INBOX MANAGEMENT SYSTEM

REFERENCE TO RELATED APPLICATION

This application is a continuation of U.S. patent application Ser. No. 16/225,143, filed Dec. 19, 2018, which is a continuation of U.S. patent application Ser. No. 13/838,452, filed Mar. 15, 2013, which claims the benefit of U.S. Provisional Application No. 61/666,556, filed Jun. 29, 2012, the entireties of which are hereby incorporated by reference herein.

FIELD OF THE INVENTION

The present description relates to offering promotions associated with a product or a service. This description more specifically relates to generating an electronic correspondence that includes a number of promotions, and analyzing the electronic correspondence in order to determine whether to present the electronic correspondence to a consumer.

DESCRIPTION OF THE RELATED ART

Merchants typically offer promotions to consumers from time to time in order to generate more business. The promotions offered may be in the form of discounts, deals, rewards or the like. Often times, a promotion, or a number of promotions, may be presented to a consumer in the form of an electronic correspondence. When a multitude of electronic correspondences are generated for a consumer, it may be difficult to determine which electronic correspondence to present to the consumer.

SUMMARY OF THE INVENTION

An apparatus and method for analyzing electronic correspondences that include one or more promotions is disclosed.

According to an aspect of the present invention, a method for analyzing an electronic correspondence comprises: determining one or more promotions to include in the electronic correspondence, each promotion having an associated promotion score; analyzing, based on at least the promotion scores, whether to send the electronic correspondence to a consumer, and in response to the analysis, determining whether to send the electronic correspondence to the consumer.

According to another aspect of the present invention, a method for analyzing a plurality of electronic correspondences comprises: determining one or more promotions to include in each of the plurality of electronic correspondences, each promotion having an associated promotion score: analyzing, based on at least the promotion scores, whether to select an electronic correspondence from the plurality of electronic correspondences to send to a consumer, wherein an electronic correspondence score for each of the plurality of electronic correspondences is generated based on the analysis: comparing the electronic correspondence scores of the plurality of electronic correspondences, and in response to the comparison, selecting a number of electronic correspondences to send to the consumer.

According to another aspect of the present invention, an apparatus for analyzing an electronic correspondence comprises a memory and a processor in communication with the memory. The memory is configured to store the electronic correspondence including one or more promotions, and store an associated promotion score for each promotion. The processor is configured to: analyze, based on at least the promotion scores, whether to send the electronic correspondence to a consumer, and in response to the analysis, determine whether to send the electronic correspondence to the consumer.

According to another aspect of the present invention, an apparatus for analyzing a plurality of electronic correspondences comprises a memory and a processor in communication with the memory. The memory is configured to store: the plurality of electronic correspondences, each of the plurality of electronic correspondences including one or more promotions, and an associated promotion scores for each promotion. The processor is configured to: analyze, based on at least the promotion scores, whether to select an electronic correspondence from the plurality of electronic correspondences to send to a consumer, wherein an electronic correspondence score is generated for each of the plurality of electronic correspondences based on the analysis, compare the electronic correspondence scores of the plurality of electronic correspondences, and in response to the comparison, select a number of electronic correspondences to send to the consumer.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
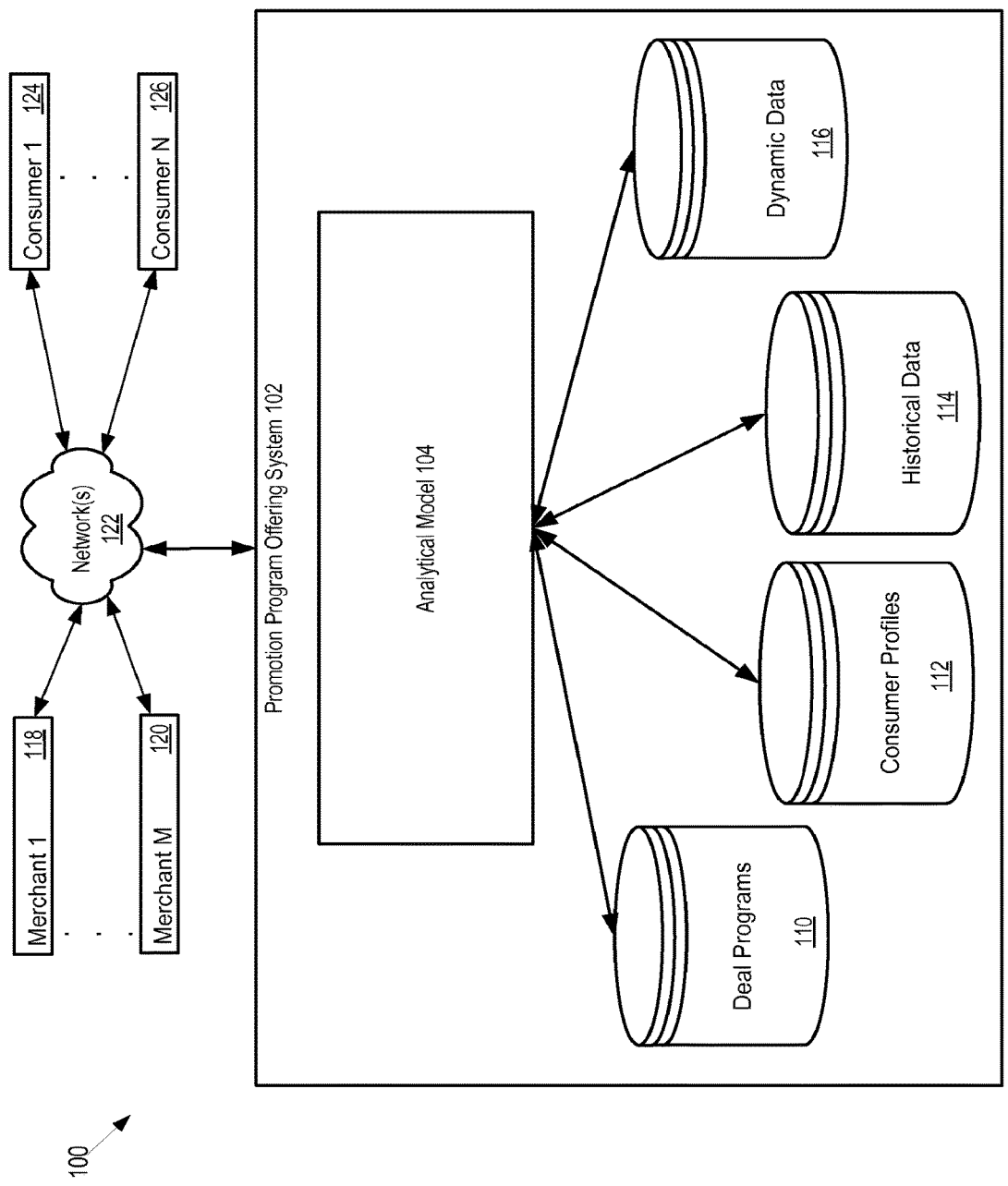
FIG. 1 illustrates a representation of a network and a plurality of devices that interact with the network to achieve an analysis of an electronic correspondence or a plurality of electronic correspondences, according to the present invention.

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

A promotion may include any type of reward, discount, coupon, credit, deal, voucher or the like used toward part (or all) of the purchase of a product or a service. The promotion may be offered as part of a larger promotion program, or the promotion may be offered as a stand-alone one time promotion. In an effort to better distinguish and identify the promotion, the promotion may include one or more attributes, such as the merchant offering the promotion (e.g., "XYZ coffee shop), the location of the promotion, the amount of the promotion, the category of the promotion (such as a restaurant promotion, a spa promotion, a travel promotion, a local promotion, etc.), the subcategory of the promotion (such as a sushi restaurant), or the like. It should be noted that promotions and deal are recited in this disclosure to be understood as being interchangeable, unless specifically stated otherwise.

As discussed in more detail below, the promotion program offering system 102 may offer promotions to a consumer. For example, the promotion program offering system 102 may offer a single promotion to the consumer, or offer multiple promotions to the consumer. The promotion(s) that are offered to the consumer may be presented in the form of an electronic correspondence. The electronic correspondence may take the form of an email, SMS text message, webpage based inbox message. VOIP voice message, or other similar types of electronic correspondences. For illustrative purposes only, the following disclosure describes the electronic correspondence in the form of an email that is sent to the consumer.

In the context of the promotion program offering system 102, one or more groupings of promotions may be offered to a consumer in an email. Examples of groupings of promotions include, without limitation, local promotions, short term exclusive promotions, travel themed promotions and holiday themed promotions. In this way, the promotion program offering system 102 may determine which one grouping (or multiple groupings) to send to a consumer in an email.

As another example, the promotion program offering system 102 may group promotions into a personal collection grouping, where the personal collection can be a highly targeted e-mail that merchandises a collection of deals from a deal repository centered on a single theme relevant to a consumer. One example of a deal repository is a bank of deals, such as disclosed in U.S. Ser. No. 13/460,745, incorporated by reference in its entirety. The promotion offering system 102 may have multiple deal repositories, such as a first bank of deals in which deals are offered to consumers for a shorter period of time (such as up to 1 week) and a second bank of deals in which deals are offered to consumers for a longer period of time (such as up to 6 months). One of the banks of deals (such as the second bank of deals) may be accessed to fetch deals, with the fetched deals scored for further evaluation, as discussed below.

The promotions may be grouped according to a theme, which may be generated in one of several ways. In one embodiment, a theme may be generated based on the consumer's past purchase(s). In this way, a theme may be generated based on one aspect of the consumer (such as the consumer's past purchase history). So that, if a consumer has previously purchased a particular deal (such as a manicure-pedicure deal), the consumer's personal collection may include similarly themed deals (such as two spa deals and three massage deals). In an alternative embodiment, the theme may be generated from pre-defined collections, such as "local favorites", "coffee & treats". These pre-defined collections may be generated independent of the consumer.

In this way, the promotion program offering system 102 may group promotions based on the consumer (such as past purchase history of the consumer) or based on information independent of the consumer. For example, the promotion program offering system 102 may determine the groupings for analysis (such as local deals, travel deals, etc.). In particular, the promotion program offering system 102 may have predetermined groupings of promotions (such as local deals, travel deals, etc.). The predetermined groupings may be based on predefined themes, attributes or criteria that are shared by promotions included in the predetermined groupings. As another example, the consumer may designate which deals the consumer desires, so that the promotion program offering system 102 may determine the groupings based on consumer input. In particular, the consumer may provide input of an interest in travel deals.

Further, the promotion program offering system 102 may determine whether a particular promotion is grouped in a particular grouping in one of several ways. As discussed above, a promotion may have one or more attributes descriptive of the promotion. For example, the promotion may be a restaurant promotion, with an attribute indicating the promotion as being a "restaurant promotion." In the case where the grouping is "restaurant promotions", the promotion program offering system 102 may search the attributes of the promotion and select the promotions with the attribute indicating "restaurant promotion". As another example, the promotion may be a local promotion, with an attribute indicating the promotion as being a "local promotion." In the case where the grouping is "local promotions", the promotion program offering system 102 may search the attributes of the promotion and select the promotions with the attribute indicating "local promotion".

As discussed above, promotions may be grouped in one of several ways. For example, a promotion collection may only be available for a limited time period. In particular, a promotion collection comprised of short term exclusive promotions may only be available for a predetermined number of hours, a single day, a predetermined number of days or some other limited period of time. Similarly, a collection of holiday themed promotions may only be available for a predetermined number of hours, a single day, a predetermined number of days or some other limited period of time surrounding a particular holiday.

As another example, a promotion collection may be available on a more permanent, or semi-permanent basis. However, the promotions that are associated, or grouped, into these promotion collections may change throughout the year. For instance, a promotion collection comprised of travel themed promotions may be available year round, but the specific promotions that are included in the travel themed promotions may be updated or changed throughout the year. The promotion collections described are not intended to be exhaustive, and have been provided for illustrative purposes only. Other types of promotion collections are contemplated.

An email may be generated that includes one or more grouping of promotions that have been grouped according to any one of the methods described above. Alternatively, an email may be generated that includes a single promotion. For instance, the generated email may include only a single deal of the day.

After generating an email that includes one or more promotions, an analysis can be applied to determine whether the email should be sent to the consumer, as discussed in more detailed below.

In an alternative embodiment, a plurality of emails are generated, and an analysis of the plurality of emails is performed in order to determine which of the plurality of emails to send to the consumer. For example, the analyzed emails may be compared to determine which of the emails to send to the consumer, as discussed in more detailed below.

FIG. 1 illustrates an overview for a promotion system 100 configured to offer promotions for promotion programs. The promotion system 100 includes a promotion program offering system 102, which communicates via one or more networks 122 with consumers, such as consumer 1 (124) to consumer N (126), and with merchants, such as merchant 1 (118) to merchant M (120). The promotion program offering system 102 includes an analytical model 104 that is in communication with databases 110, 112, 114, 116. The analytical model 104 may include one or more components for grouping a number of promotions according to any one of the methods described above. The analytical model 104 may further include one or more components for generating emails that include one or more groupings of promotions, and for generating emails that include a single promotion. The analytical model 104 may also include one or more components for analyzing the generated emails in order to determine whether to send an email to a consumer.

A promotion score may be generated by a promotion scoring component included in the analytical model 104 for each promotion in the promotion system 100 with respect to a particular consumer. The promotion score of a promotion may be an indication of a probability that the particular consumer in the promotion system 100 will accept the promotion.

To accomplish the generation of promotion scores, the analytical model 104 communicates with multiple databases that are part of the promotion program offering system 102 such as a promotion program database 110, consumer profiles database 112, historical data database 114 and dynamic data database 116. So with respects to the particular consumer, the analytical model 104 may access the databases 110, 112, 114 and 116 in order to obtain specific attribute information on the particular consumer and the various promotions. As described throughout this disclosure, various attributes may be associated or assigned to a promotion and a consumer in the promotion system 100. Then the obtained attribute information may be utilized to generate promotion scores for each promotion with respects to the particular consumer, where the promotion scores are an indication of a probability that the particular consumer will accept an offer from a respective promotion. An example of scoring promotions is disclosed in U.S. application Ser. No. 13/411,502, incorporated by reference herein in its entirety. An example for scoring a grouping of promotions is disclosed in U.S. Provisional Application No. 61/663,508, incorporated by reference in its entirety.

The promotion programs database 110 is responsible for storing data detailing various promotions and promotion programs that are available for offer in the promotion program offering system 102. In order to input promotion program information into the promotions program database 110, merchants may optionally communicate via the networks 122 with the promotion program offering system 102 to input the information detailing the various promotion program offerings.

The consumer profiles database 112 includes profiles for the consumers, consumer 1 (124) to consumer N (126), that are included in the promotion system 100. The attribute information detailed for a consumer stored in the consumer profiles database 112 may include, but is not limited to, name, age, address, occupation, educational background, previously accepted promotion program offerings, previously rejected promotion program offerings, gender and the like. Any one, some or all of the attributes of the consumer may be used by the promotion offering system 102 in determining whether to offer a promotion to a consumer.

Consumer attributes stored in the consumer profiles database 112 may also be referenced to create personal promotion collections that relate to a particular consumer. So that, unlike the predetermined promotion collections described previously that may be viewed or presented to all consumers, personal promotion collections may be tailored to a particular consumer.

For instance, a particular consumer may have a consumer attribute that indicates the particular consumer lives in a particular location (such as certain neighborhood). In response to this attribute, the promotion program offering system 102 may create a personal collection for the particular consumer that is comprised of promotions that exist in the particular consumer's neighborhood. Or, the particular consumer may have a consumer attribute that indicates the particular consumer has bought Italian restaurant promotions in the past. Given the particular consumer's past purchase history, the promotion program offering system 102 may create a personal collection for the particular consumer that is comprised of Italian restaurant promotions. In this way, a consumer's attribute information may be referenced to create a personal promotion collection that is tailored to the consumer.

The creation of a promotion collection may be accomplished in one of several ways. In one way, the promotion program offering system 102 may store in a database an attribute or other indicator of the program collection (such as a look-up table correlating the identity of the particular consumer to the consumer attribute), and thereafter use the attribute or other indicator when searching the promotion programs database 110 to identify promotion programs for the personal collection. In another way, the promotion program offering system 102 may create a promotion collection by storing promotions in the program collection in a separate database (or section of the database) associated with the promotion collection.

The historical data database 114 includes information detailing the past performance of promotion program offerings that have been presented in the promotion program system 102 in previous time periods. The historical data database 114 may include, but is not limited to, rates of acceptances of specific promotion programs, attributes of consumers that accepted or rejected specific promotion programs, and the like.

The dynamic data database 116 includes information detailing the past performance of a promotion program offering that is currently active in the promotion offering system 102. So that, while a promotion program referenced in the dynamic data database 116 is currently active, the data stored in the dynamic data database 116 may pertain to performance data of the active promotion program from a previous time period.

Although FIG. 1 has been illustrated to show separate databases 110, 112, 114 and 116, FIG. 1 has been illustrated for demonstrative purposes only, and it is contemplated to have the databases 110, 112, 114 and 116 arranged in any combination of one or more memories/storage units.

Figure 2:
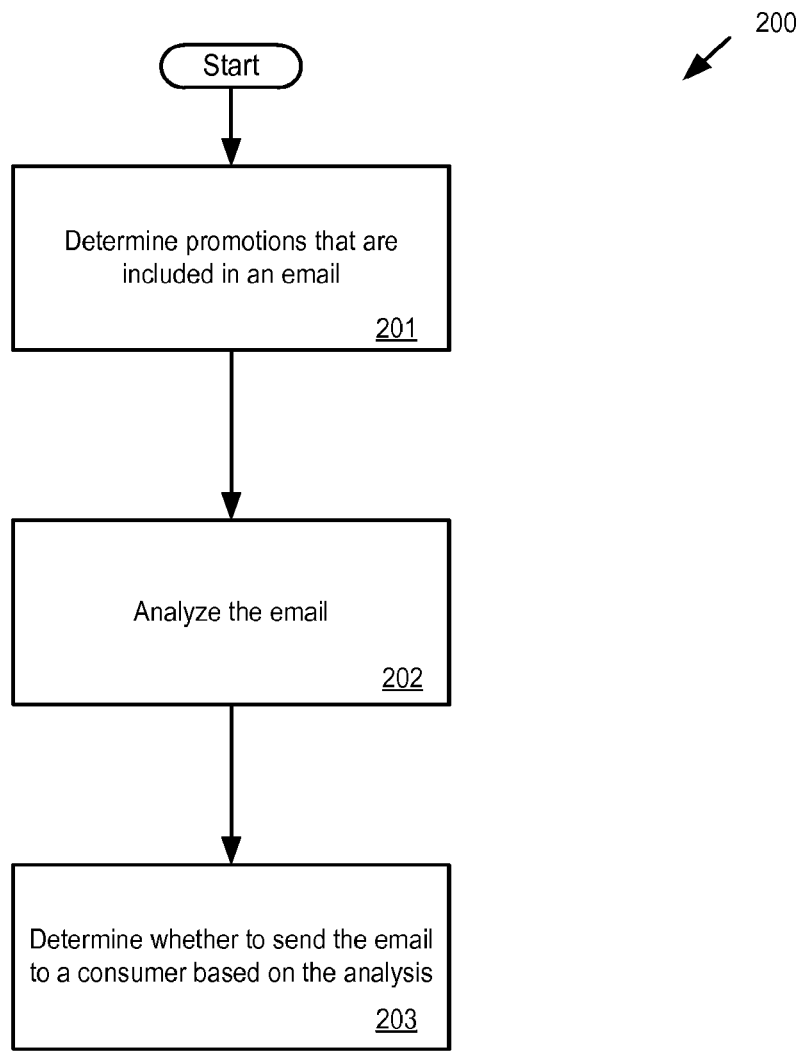
FIG. 2 illustrates a flow chart describing an overview of a process for analyzing an electronic correspondence, according to the present invention.

FIG. 2 illustrates a flow chart 200 describing an overview for analyzing an email that includes one or more promotions, and then determining whether to send the email to consumer based on the analysis. As will be described in detail below, the determination whether to send the email to the consumer may consider a number of different factors such as intended goals, business rules, information pertaining to the consumer and/or information pertaining to promotions included in the email, among other variables.

At 201, the promo on program offering system determines which promotion(s) to include in an email. One example of a system to determine which promotion(s) to include in an email is disclosed in U.S. application Ser. No. 13/411,502, incorporated by reference herein in its entirety. The promotions that are included in the email may be determined according to any of the methods described in this disclosure. For instance, the email may include only a single promotion. Alternatively, the email may include one or more promotion groups according to any one of the methods provided above.

At 202, the email is analyzed. As described in more detail with reference to FIGS. 3-4 below, the analysis may be based on, but is not limited to, performing an arithmetic function on promotion scores of promotions included in the email. From the analysis at 202, an email score (or other indicator) may be obtained for the email. At 203, a determination is made on whether to send the email to a consumer that is based on the analysis from 202.

Figure 3:
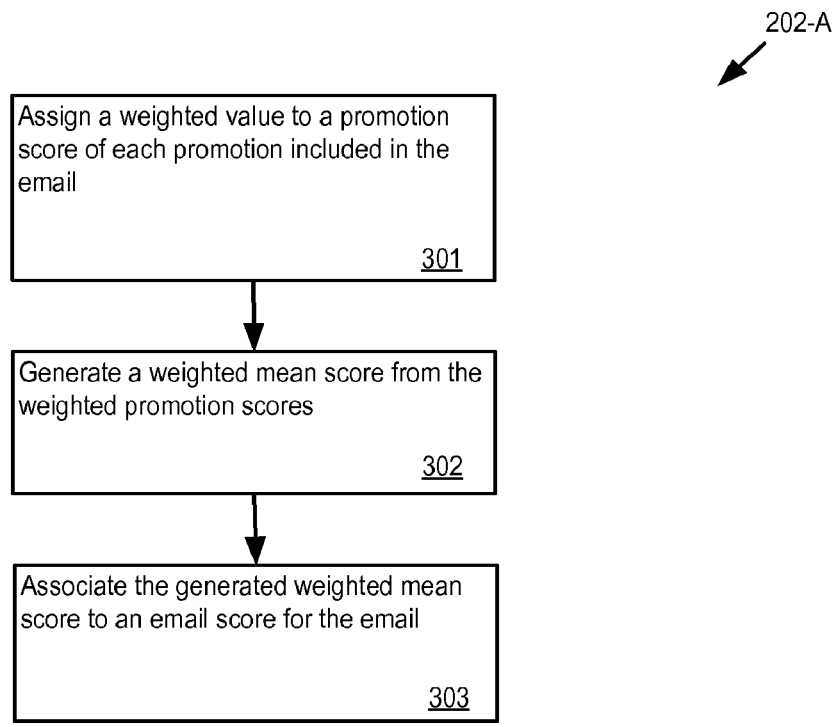
FIG. 3 illustrates a flow chart describing an analysis for a number of promotions that are included in an electronic correspondence.

FIG. 3 illustrates a flow chart 202-A that describes one type of analysis that may be applied to the promotion(s) that is/are included in the email. From the analysis described in flow chart 202-A, an email score may be associated to the email. It can be seen that the flow chart 202-A is an exemplary expansion of 202 in FIG. 2.

At 301, a weighted value is assigned to a promotion score of each promotion that is included in the email. As previously mentioned, a promotion score for a promotion may be generated according to U.S. application Ser. No. 13/411,502, incorporated by reference herein in its entirety. The weighted values may be assigned such that the best promotion score is assigned the most weighting value, and each lesser promotion score is assigned a progressively lower weighing value.

At 302, a weighted mean score is generated by averaging the weighted promotion scores from 301.

Then at 303, the weighted mean score is associated with an email score for the email. The email score may be utilized when determining whether to send the email at 203 of flow chart 200, as described above.

Although not specifically illustrated, the email score may alternatively be obtained according to any one of the methods for scoring a group of promotions described in U.S. Provisional Application No. 61/663,508, incorporated by reference in its entirety.

For instance, instead of generating a weighted mean score at 302, a weighted sum score may be generated by summing each weighted promotion score. The weighted sum score may then be associated to an email score for the email at 303. This email score may then be utilized when determining whether to send the email to the consumer at 203 of flow chart 200, as described above.

Alternatively, a mean score may be generated by averaging the promotion scores for some, or all, of the promotions included in the email. The mean score may then be associated to an email score for the email. This email score may then be utilized when determining whether to send the email to the consumer at 203 of flow chart 200, as described above.

Alternatively, a sum score may be generated by summing the promotion scores for some, or all, of the promotions included in the email. The sum score may then be associated to an email score for the email. This email score may then be utilized when determining whether to send the email to the consumer at 203 of flow chart 200, as described above.

Alternatively, a median score may be generated by obtaining the median value from some, or all, of the promotion scores of promotions included in the email. The median score may then be associated to an email score for the email. This email score may then be utilized when determining whether to send the email to the consumer at 203 of flow chart 200, as described above.

Alternatively, a standard deviation analysis may be generated from some, or all, of the promotion scores of promotions included in the email. The standard deviation analysis may then be associated to an email score for the email. This email score may then be utilized when determining whether to send the email to the consumer at 203 of flow chart 200, as described above.

Alternatively, a local maximum score may be generated by obtaining the best promotion score from amongst all the promotions included in the email. The local maximum score may then be associated to an email score for the email. This email score may then be utilized when determining whether to send the email to the consumer at 203 of flow chart 200, as described above.

The analyses of the email described above are not intended to be exhaustive, and are provided for illustrative purposes only. Other types of analyses of the email to obtain the email score are contemplated.

Figure 4:
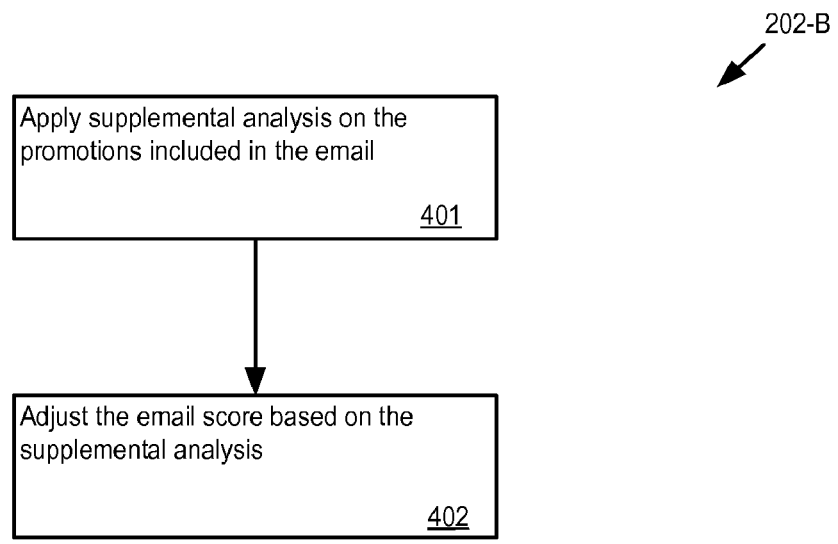
FIG. 4 illustrates a flow chart describing a supplemental analysis that may be applied to promotions that are included in an electronic correspondence, according to the present invention.

In some embodiments, the email score obtained above may be utilized directly for determining whether to send the email to the consumer at 203 of flow chart 200. In other embodiments, a supplemental analysis may be applied to adjust the email score obtained above. FIG. 4 illustrates a flow chart 202-B describing one such supplemental analysis that may be applied to adjust the email score obtained above. Flow chart 202-B is an exemplary expansion of 202 from flow chart 200, wherein flow chart 202-B may supplement flow chart 202-A.

At 401, a supplemental analysis is applied on the promotions included in the email. The supplemental analysis considers a number of different variables such as, but not limited to, promotion attributes, consumer attributes, business rules, business goals and/or other such similar variables.

At 402, the email score may be adjusted based on the supplemental analysis. For instance, the supplemental analysis may consider attributes of the promotions that are included in the email against attributes of the consumer. The promotion attributes and consumer attributes may be obtained from any one of the databases 110, 112, 114, 116.

Specifically, the supplemental analysis may access the databases 110, 112, 114, 116 to determine an engagement level of the consumer with respect to the promotions that are included in the email. The past engagement level of the consumer may be referenced in order to determine whether sending the email may cause a change to the future engagement level of the consumer. The past engagement level of the consumer may be referenced either alone, or with consideration of the promotions that are included in the email.

The engagement level may be based on one or more indicators, such as a number, or frequency, of promotions the consumer has accepted in the past. The engagement level may also be based on a number, or frequency, of promotions the consumer is predicted to accept in the future. In this way, if the past engagement level indicates that sending the email will likely increase the consumer's engagement level (e.g., the email includes promotions, or similar promotions, that the consumer has accepted in the past; or the number of overall promotions accepted by the consumer in the past exceeds a certain threshold), the email score can be adjusted to a greater value. Conversely, if the past engagement level indicates that sending the email is likely to decrease the consumer's engagement level (e.g., consumer is likely to ignore the promotions included in the email or likely to unsubscribe to receiving emails based on past engagement patterns; the overall number of promotions accepted by the consumer in the past falls below a certain threshold), the email score may be lowered.

The engagement level may also be based on a total value of promotions that have been accepted by the consumer in the past. The engagement level may further be based on a total value of promotions that the consumer is predicted to accept in the future. In this way, if the past engagement level indicates that sending the email will likely increase the consumer's engagement level (e.g., the value of the promotions included in the email surpass a certain threshold; or the value of promotions accepted by the consumer in the past surpasses a certain threshold), the email score can be adjusted to a greater value. Conversely, if the past engagement level indicates that sending the email is likely to decrease the consumer's engagement level (e.g., the value of the promotions included in the email is below a certain threshold; or the value of promotions accepted by the consumer in the past is below a certain threshold), the email score may be lowered.

The engagement level may also be based on the consumer's treatment of previously-sent emails, such as a number of past emails that have been opened by the consumer. Opening an email is distinguishable from merely receiving an email in that confirmation data may be transmitted back to the sender when the email is opened. In this way, if the past engagement level indicates that sending the email will likely increase the consumer's engagement level (e.g., emails including promotions that are the same or similar to the promotions in the current email have been opened in the past by the consumer; or the overall number of emails opened by the consumer in the past surpasses a certain threshold), the email score can be adjusted to a greater value. Conversely, if the past engagement level indicates that sending the email is likely to decrease the consumer's engagement level (e.g., emails including promotions that are the same or similar to the promotions included in the current email have not been opened in the past by the consumer: or the overall number of emails opened by the consumer in the past falls below a certain threshold), the email score may be lowered.

If the past engagement level indicates that sending the email may result in the consumer unsubscribing from the promotion email service, the email may be prevented from being sent to the consumer. Alternatively, the email score may be adjusted to a value that indicates the email should not be sent.

It is noted that in addition to the consumer's personal past engagement history, the past engagement analyses described above may also consider the engagement levels for other consumers that may, or may not, be similarly situated as the consumer in question.

In another instance, the supplemental analysis may consider a set of business goals that have been implemented. The business goals may, or may not, be relevant to the promotions in the email or the consumer.

One example of a business goal is to increase a number of overall activations by consumers. The activations may refer to the consumer signing up for a particular service (e.g., promotion email receiving service). The activations may also refer to the acceptance of a promotion. In order to determine whether the promotions included in the email will increase the consumer's probability of activation, the consumer's purchasing history of the promotions may be analyzed. From the analysis, a probability of whether the promotions included in the email will increase the probability of the consumer activation may be generated. In this way, if the probability is greater than a certain threshold amount, the email score can be adjusted to a greater value. Conversely, if the probability falls below a certain threshold amount, the email score may be adjusted to a lower value.

Another example of a business goal is to increase activity in certain business units. For instance, a business goal may seek to increase the number of travel promotions that are accepted by consumers. In this way, if the email contains a number of travel promotions that surpasses a certain threshold number, the email score can be adjusted to a greater value. Conversely, if the email does not contain a number of travel promotions that surpasses a certain threshold number, the email score can be adjusted to a lower value. Although travel promotions has been referenced as an example of a promoted business unit, other business units based on any one of the attributes described throughout this disclosure are contemplated.

In another instance, the supplemental analysis may consider certain business rules. One example of a business rule comprises preventing a same promotion from being sent to a consumer within a predetermined amount of time. In this way, if the email includes one or more promotions that have previously been sent to the consumer within the predetermined amount of time, the email score may be recalculated with the duplicate promotion removed from the email. Alternatively, the email score may be adjusted to a lower value, where the lowered email score may be a lowest possible value. The email score being assigned the lowest possible value may be an indication that the email is not to be sent out to the consumer.

Another example of a business rule is promoting promotions during time periods where the type of promotions have historically performed better. Under such a rule, past performance information of promotions may indicate that certain promotions performed better when sent to the consumer during a first time period as opposed to a second time period. The first time period may, for example, be a morning time period whereas the second time period may, for example, be an evening time period. In this way, if the email includes a number of promotions that have performed well in the past when sent to the consumer during a similar or same time period as the current time period, the email score may be adjusted to a greater value. Conversely, if the email includes a number of promotions that have performed poorly in the past when sent to the consumer during a similar or same time period as the current time period, the email score may be adjusted to a lower value.

Still another example of a business rule is limiting a number of emails that are sent to the consumer within a predetermined time period. In this way, if the number of emails that have been sent to the consumer within the predetermined time period has already exceeded the limit, the email score may be adjusted to a value that indicates the email is not to be sent. Alternatively, this business rule may be implemented at 203 of flow chart 200 such that the email is simply blocked from being sent to the consumer without any adjustment to the email score.

In another instance, the supplemental analysis may examine recorded instances where the presentation of certain promotions grouped together resulted in a higher acceptance rate than when the same promotions were presented to the consumer alone. Such combinations of promotions may be stored in any one of the databases 110, 112, 114, 116. In this way, if the email includes any such grouping of promotions, the email score may be adjusted to a greater value.

The email score may be adjusted according to one or more of the supplemental analyses described above. The supplemental analysis may be processed following the analysis described by flow chart 202-A as an adjustment on the email score obtained from flow chart 202-A as described above. Alternatively, the analysis described by flow chart 202-A may be processed simultaneously with the supplemental analysis described by flow chart 202-B in order to obtain the email score. In either case, any combination of one or more of the supplemental analyses described above may be applied.

Figure 5:
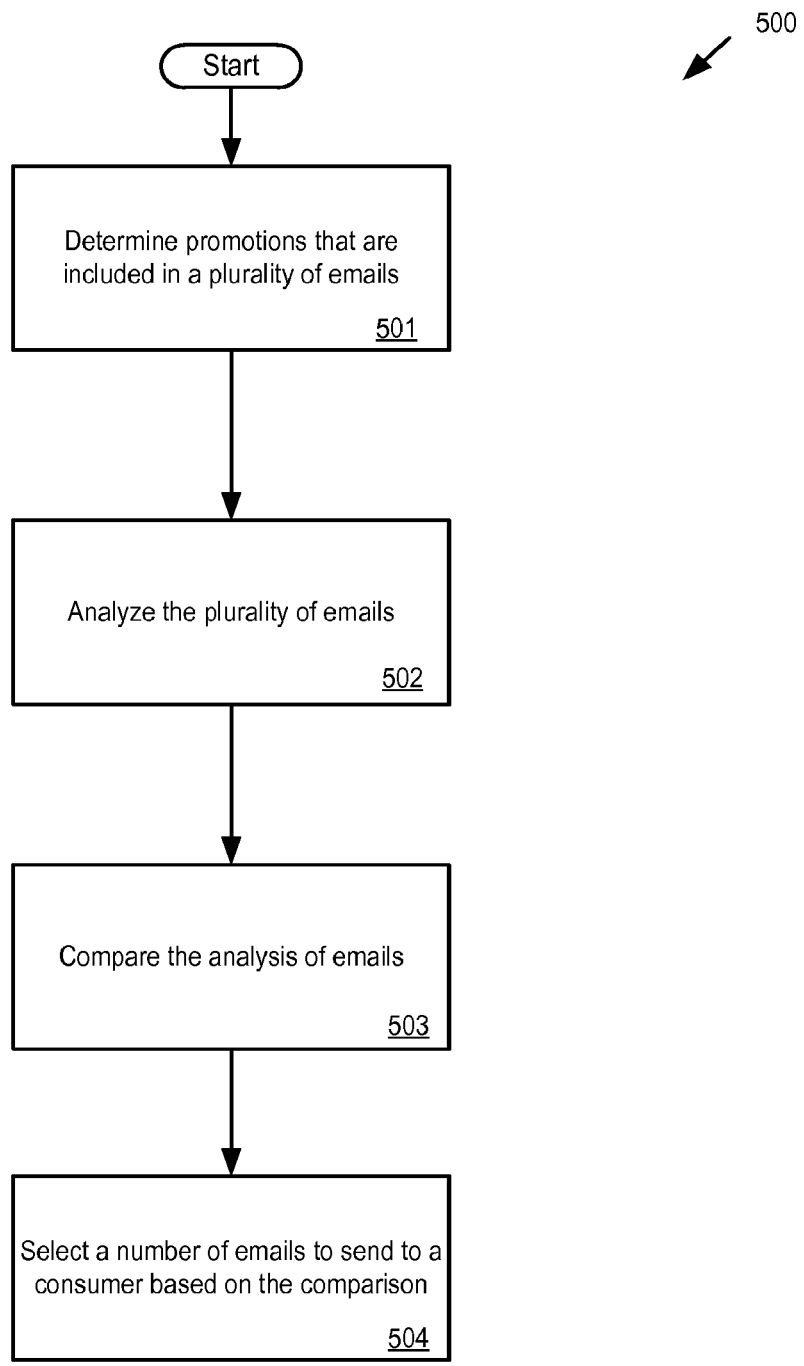
FIG. 5 illustrates a flow chart describing an overview of a process for analyzing a plurality of electronic correspondences, according to the present invention.

FIG. 5 illustrates a flow chart 500 describing a process for analyzing a plurality of emails, comparing the analysis of the plurality of emails, and selecting a number of emails to be sent to a consumer.

At 501, a plurality of emails are generated, and a determination is made as to which promotions in the promotion program offering system 102 are included in each of the plurality of emails. The promotions that are included in the emails may be determined according to any of the methods described in this disclosure. For instance, an email may include only a single promotion. Alternatively, an email may include one or more promotion groups according to any one of the methods provided above.

At 502, each of the plurality of emails is analyzed. The analysis of each email may be accomplished according to any one of the methods described with reference to 202 of the flow chart 200. The reference to 202 includes the process described in flow chart 202-A and flow chart 202-B. From the analysis at 502, an email score may be obtained for each email.

Figure 6:
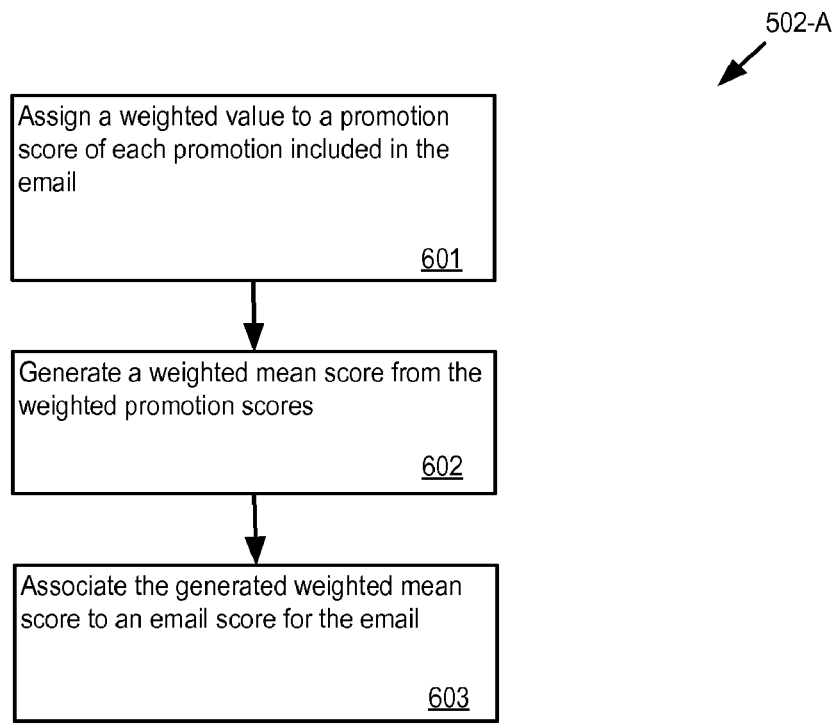
FIG. 6 illustrates a flow chart describing an analysis for a number of promotions that are included in an electronic correspondence.

For instance, FIG. 6 illustrates flow chart 502-A describing an analysis that may be applied to the promotion(s) that is/are included in each of the emails.

At 601, a weighted value is assigned to a promotion score of each promotion that is included in the email. The weighted values may be assigned such that the best promotion score is assigned the most (e.g., highest) weighting value, and each lesser promotion score will be assigned a progressively lower weighing value.

At 602, a weighted mean score is generated by averaging the weighted promotion scores from 601.

Then at 603, the weighted mean score is associated to an email score for the email. The email score may be utilized when comparing the analysis of emails and selecting a number of emails to send to the consumer in flow chart 500.

Other methods for analyzing the promotions that are included for each email are contemplated as provided above.

At 503, the analyses of the plurality of emails are compared. In this way, the email score for each email that was obtained from 502 is compared at 503. It is noted that a supplemental analysis (such as according to the supplement analyses described with reference to 202 of flow chart 202-B) may be implemented at either 502 or 503 of the process described by flow chart 500.

When the email scores that are compared at 503 have been generated according to different types of analyses, a normalization of the email scores may be applied in order to enable a more relevant comparison of the email scores.

At 504, a number of emails may be selected to be sent to the consumer based on the comparison at 503. In some embodiments, the email score dictates whether the email is selected in that if the email score exceeds a certain threshold, the email is selected. The number of emails selected at 504 may be one, or another predetermined number, where the selected emails have the greatest email scores.

Figure 7:
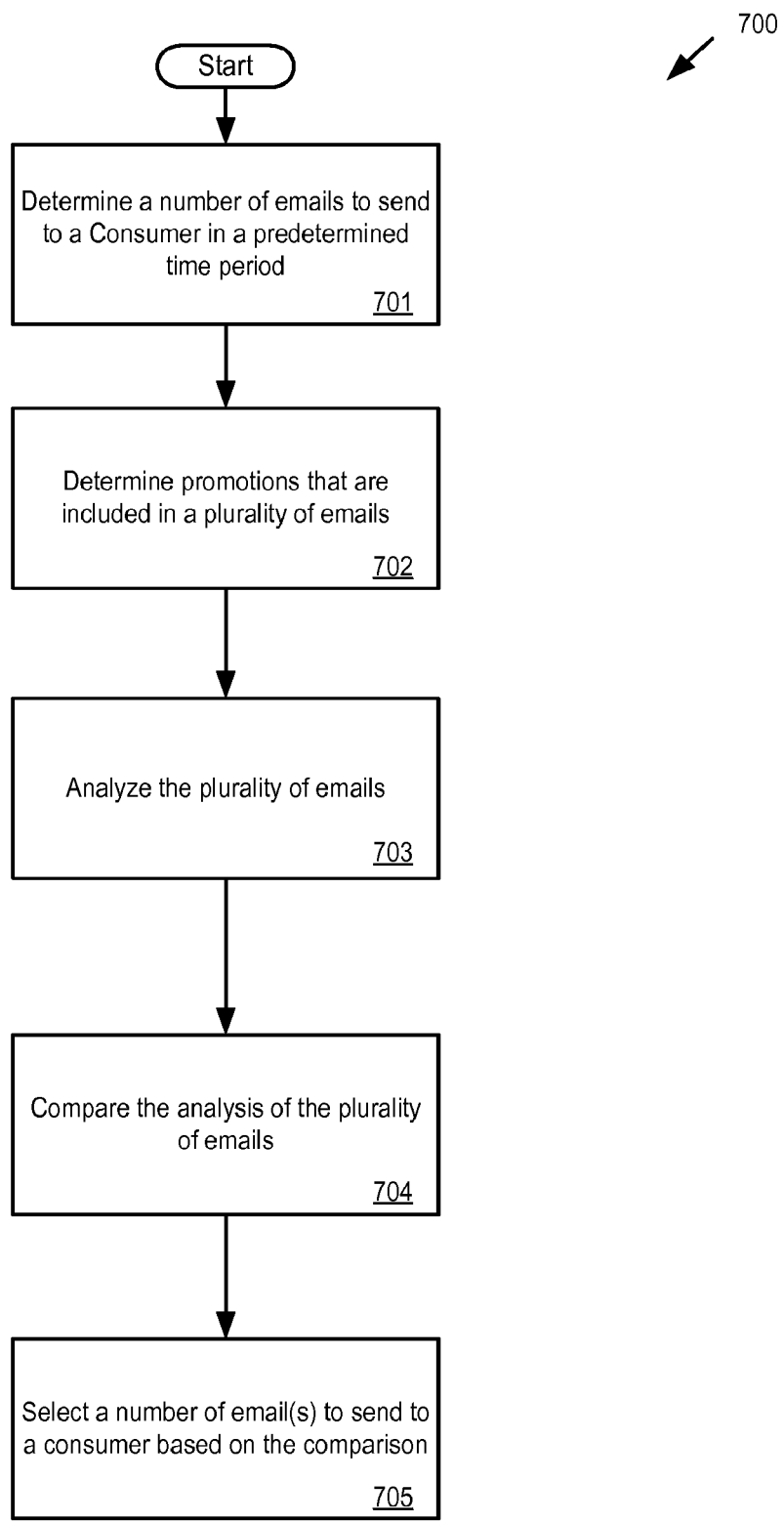
FIG. 7 illustrates a flow chart describing a supplemental analysis that may be applied to promotions that are included in an electronic correspondence, according to the present invention.

FIG. 7 illustrates a flow chart 700 that describes a process for analyzing a plurality of emails, comparing the analysis of the plurality of emails, and selecting a number of emails to be sent to a consumer, where a number of emails to send to a consumer within a predetermined time period is also considered.

At 701, a number of emails that are to be sent to a consumer within a predetermined time period is determined. The number of emails that are sent to a consumer may be limited in order to keep the freshness of the promotions alive, as well as to avert the consumer from being desensitized to or inundated by the promotion emails.

At 702, a plurality of emails are generated, and a determination is made as to which promotions in the promotion program offering system 102 are included in each of the plurality of emails. The promotions that are included in the emails may be determined according to any of the methods described in this disclosure. For instance, an email may include only a single promotion. Alternatively, an email may include one or more promotion groups according to any one of the methods provided above.

At 703, each email is analyzed. The analysis of each email may be accomplished according to any one of the methods described with reference to 202 of the flow chart 200. The reference to 202 includes the process described in flow chart 202-A and flow chart 202-B. From the analysis at 703, an email score may be obtained for each email.

At 704, the analyses of the plurality of emails are compared. In this way, the email score for each email that was obtained from 703 is compared at 704. It is noted that a supplemental analysis (as according to the supplement analyses described with reference to 202 of flow chart 202-B) may be implemented at either 703 or 704 of the process described by flow chart 700.

When the email scores that are compared at 704 have been generated according to different types of analyses, a normalization of the email scores may be applied in order to enable a more relevant comparison of the email scores.

At 705, a number of emails may be selected to be sent to the consumer based on the comparison at 704. In some embodiments the email score must surpass a certain threshold to be selected. The number of emails selected at 705 may be one, or another predetermined number, where the selected emails have the greatest email scores.

In addition, the number of emails that are allowed to be sent to the consumer in the predetermined time period is considered when selecting the number of emails at 705. In this way, selecting the number of emails at 705 should not surpass the number of emails that are sent to a consumer within the predetermined time period.

Figure 8:
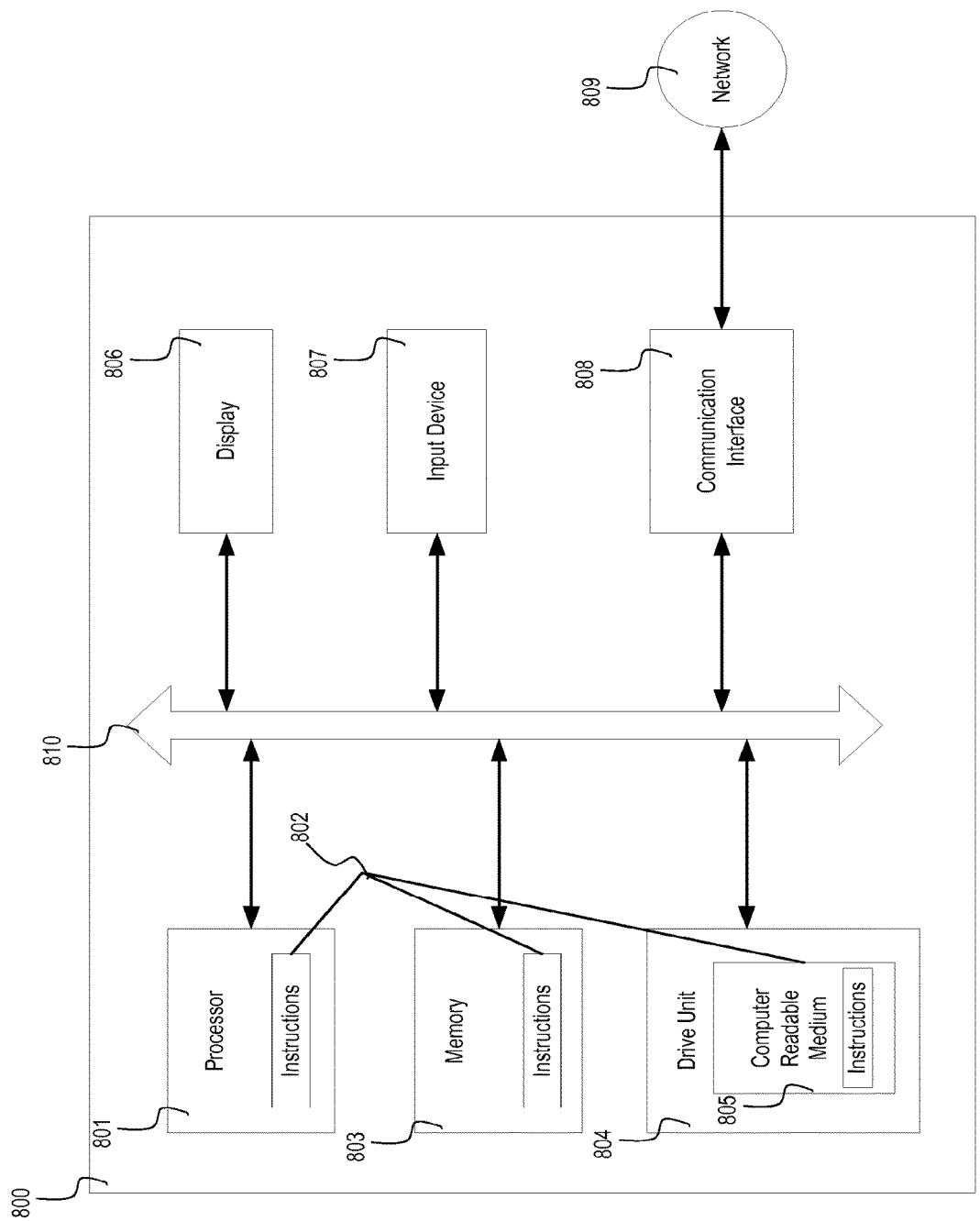
FIG. 8 is a general computer system, programmable to be a specific computer system, which may represent any of the computing devices referenced herein.

FIG. 8 illustrates a general computer system 800, programmable to be a specific computer system 800, which can represent any server, computer or component, such as consumer 1 (124), consumer N (126), merchant 1 (118), merchant M (120), and promotion program offering system 102. The computer system 800 may include an ordered listing of a set of instructions 802 that may be executed to cause the computer system 800 to perform any one or more of the methods or computer-based functions disclosed herein. The computer system 800 can operate as a stand-alone device or can be connected, e.g., using the network 122, to other computer systems or peripheral devices.

In a networked deployment, the computer system 800 can operate in the capacity of a server or as a client-user computer in a server-client user network environment, or as a peer computer system in a peer-to-peer (or distributed) network environment. The computer system 800 may also be implemented as or incorporated into various devices, such as a personal computer or a mobile computing device capable of executing a set of instructions 802 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 800 can include a memory 803 on a bus 810 for communicating information. Code operable to cause the computer system to perform any of the acts or operations described herein can be stored in the memory 803. The memory 803 may be a random-access memory, read-only memory, programmable memory, hard disk drive or any other type of volatile or non-volatile memory or storage device.

The computer system 800 can include a processor 801, such as a central processing unit (CPU) and/or a graphics processing unit (GPU). The processor 801 may include one or more general processors, digital signal processors, application specific integrated circuits, field programmable gate arrays, digital circuits, optical circuits, analog circuits, combinations thereof, or other now known or later-developed devices for analyzing and processing data. The processor 801 may implement the set of instructions 802 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 800 can also include a disk or optical drive unit 804. The disk drive unit 804 may include a computer-readable medium 805 in which one or more sets of instructions 802, e.g., software, may be embedded. Further, the instructions 802 may perform one or more of the operations as described herein. The instructions 802 may reside completely, or at least partially, within the memory 803 or within the processor 801 during execution by the computer system 800. Accordingly, the databases 110, 112, 114, or 116 may be stored in the memory 803 or the disk unit 804.

The memory 803 and the processor 801 also may include computer-readable media as discussed above. A "computer-readable medium," "computer-readable storage medium," "machine readable medium," "propagated-signal medium." or "signal-bearing medium" may include any device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 800 may include an input device 807, such as a keyboard or mouse, configured for a user to interact with any of the components of system 800. It may further include a display 806, such as a liquid crystal display (LCD), a cathode ray tube (CRT), or any other display suitable for conveying information. The display 806 may act as an interface for the user to see the functioning of the processor 801, or specifically as an interface with the software stored in the memory 803 or the drive unit 804.

The computer system 800 may include a communication interface 808 that enables communications via the communications network 122. The network 122 may include wired networks, wireless networks, or combinations thereof. The communication interface 808 network may enable communications via any number of communication standards, such as 802.11, 802.17, 802.20, WiMax, 802.15.4, cellular telephone standards, or other communication standards, as discussed above. Simply because one of these standards is listed does not mean any one is preferred.

Further, the promotion program offering system 102, as depicted in FIG. 1 may comprise one computer system or multiple computer systems. Further, the flow diagrams illustrated in the Figures may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. An apparatus configured for improving transmission efficiency of electronic correspondence data by selectively transmitting electronic correspondence, the apparatus comprising at least one processor and at least one non-transitory memory, the at least one non-transitory memory including computer program instructions which when executed by the at least one processor, causes the apparatus to:
   access one or more databases each containing a plurality of promotions, each promotion of the plurality of promotions having an associated promotion score;
   determine a selected one or more promotions from the plurality of promotions to include in a plurality of electronic correspondences to be transmitted to a consumer;
   generate an electronic correspondence score for each of the plurality of electronic correspondences, wherein the electronic correspondence score is based at least in part on analyzing the associated promotion scores of the selected one or more promotions;
   generate the plurality of electronic correspondences to include the selected one or more promotions;
   determine a supplemental analysis threshold;
   apply a supplemental analysis to each of the plurality of electronic correspondences;
   adjust the electronic correspondence score of at least one of the plurality of electronic correspondences based at least in part on the supplemental analysis, wherein adjusting the electronic correspondence score comprises:
      adjusting the electronic correspondence score to a greater value when the supplemental analysis satisfies the supplemental analysis threshold; and
      adjusting the electronic correspondence score to a lower value when the supplemental analysis fails to satisfy the supplemental analysis threshold; and
   for each of the plurality of electronic correspondences, determine whether the respective adjusted electronic correspondence score satisfies a transmission threshold value;
   select one or more electronic correspondences wherein the adjusted electronic correspondence score satisfies the transmission threshold value; and
   transmit the selected one or more electronic correspondences to a consumer device associated with the consumer.

2. The apparatus of claim 1, wherein the supplemental analysis threshold is a threshold number of electronic correspondences which can be sent to the consumer within a predetermined time period and applying the supplemental analysis comprises determining a number of electronic correspondences previously sent to the consumer within a current predetermined time period.

3. The apparatus of claim 2, wherein the supplemental analysis fails to satisfy the supplemental analysis threshold when the determined number of electronic correspondences previously sent to the consumer within the current predetermined time period exceeds the threshold number of electronic correspondences which can be sent to the consumer within the predetermined time period.

4. The apparatus of claim 1, wherein the supplemental analysis threshold is a selected promotion grouping presence and applying the supplemental analysis comprises determining whether the electronic correspondence includes a selected promotion grouping of one or more promotions that have been accepted by the consumer at a greater rate when presented together than either one of the promotions presented to the consumer alone.

5. The apparatus of claim 4, wherein the supplemental analysis satisfies the supplemental analysis threshold when the electronic correspondence includes the selected promotion grouping.

6. The apparatus of claim 1, wherein the supplemental analysis threshold is a threshold engagement level and applying the supplemental analysis comprises determining a past engagement level of the consumer.

7. The apparatus of claim 6, wherein the past engagement level is based on a total number of past promotions accepted by the consumer, a total value of past promotions accepted by the consumer, or both.

8. The apparatus of claim 6, wherein the past engagement level is based on total number of past electronic correspondences that have been accessed by the consumer.

9. The apparatus of claim 1, wherein the supplemental analysis threshold is a threshold activation probability and applying the supplemental analysis comprises:
    analyzing a promotion purchase history associated with the consumer; and
    based on at least the analysis of the promotion purchase history, determining a probability that the selected one or more promotions will increase consumer activation.

10. The apparatus of claim 1, wherein the supplemental analysis threshold is a threshold number of promotions associated with a selected promotion category and applying the supplemental analysis comprises:
    selecting the promotion category; and
    determining a number of promotions of the selected one or more promotions associated with the selected promotion category.

11. A computer-implemented method for improving transmission efficiency of electronic correspondence data by selectively transmitting electronic correspondence, the computer-implemented method comprising:
    accessing one or more databases each containing a plurality of promotions, each promotion of the plurality of promotions having an associated promotion score;
    determining a selected one or more promotions from the plurality of promotions to include in a plurality of electronic correspondences to be transmitted to a consumer;
    generating an electronic correspondence score for each of the plurality of electronic correspondences, wherein the electronic correspondence score is based at least in part on analyzing the associated promotion scores of the selected one or more promotions;
    generating the plurality of electronic correspondences to include the selected one or more promotions;
    determining a supplemental analysis threshold;
    applying a supplemental analysis to each of the plurality of electronic correspondences;
    adjusting the electronic correspondence score of at least one of the plurality of electronic correspondences based at least in part on the supplemental analysis, wherein adjusting the electronic correspondence score comprises:
        adjusting the electronic correspondence score to a greater value when the supplemental analysis satisfies the supplemental analysis threshold; and
        adjusting the electronic correspondence score to a lower value when the supplemental analysis fails to satisfy the supplemental analysis threshold; and
    for each of the plurality of electronic correspondences, determine whether the respective adjusted electronic correspondence score satisfies a transmission threshold value;
    selecting one or more electronic correspondences wherein the adjusted electronic correspondence score satisfies the transmission threshold value; and
    transmitting the selected one or more electronic correspondences to a consumer device associated with the consumer.

12. The computer-implemented method of claim 11, wherein the supplemental analysis threshold is a threshold number of electronic correspondences which can be sent to the consumer within a predetermined time period and applying the supplemental analysis comprises determining a number of electronic correspondences previously sent to the consumer within a current predetermined time period.

13. The computer-implemented method of claim 12, wherein the supplemental analysis fails to satisfy the supplemental analysis threshold when the determined number of electronic correspondences previously sent to the consumer within the current predetermined time period exceeds the threshold number of electronic correspondences which can be sent to the consumer within the predetermined time period.

14. The computer-implemented method of claim 11, wherein the supplemental analysis threshold is a selected promotion grouping presence and applying the supplemental analysis comprises determining whether the electronic correspondence includes a selected promotion grouping of one or more promotions that have been accepted by the consumer at a greater rate when presented together than either one of the promotions presented to the consumer alone.

15. The computer-implemented method of claim 14, wherein the supplemental analysis satisfies the supplemental analysis threshold when the electronic correspondence includes the selected promotion grouping.

16. The computer-implemented method of claim 11, wherein the supplemental analysis threshold is a threshold engagement level and applying the supplemental analysis comprises determining a past engagement level of the consumer.

17. The computer-implemented method of claim 16, wherein the past engagement level is based on a total number of past promotions accepted by the consumer, a total value of past promotions accepted by the consumer, or both.

18. The computer-implemented method of claim 16, wherein the past engagement level is based on total number of past electronic correspondences that have been accessed by the consumer.

19. The computer-implemented method of claim 11, wherein the supplemental analysis threshold is a threshold activation probability and applying the supplemental analysis comprises:
    analyzing a promotion purchase history associated with the consumer; and
    based on at least the analysis of the promotion purchase history, determining a probability that the selected one or more promotions will increase consumer activation.

20. The computer-implemented method of claim 11, wherein the supplemental analysis threshold is a threshold number of promotions associated with a selected promotion category and applying the supplemental analysis comprises:
    selecting the promotion category; and determining a number of promotions of the selected one or more promotions associated with the selected promotion category.

\* \* \* \* \*